United States Patent Office 3,461,358
Patented Aug. 12, 1969

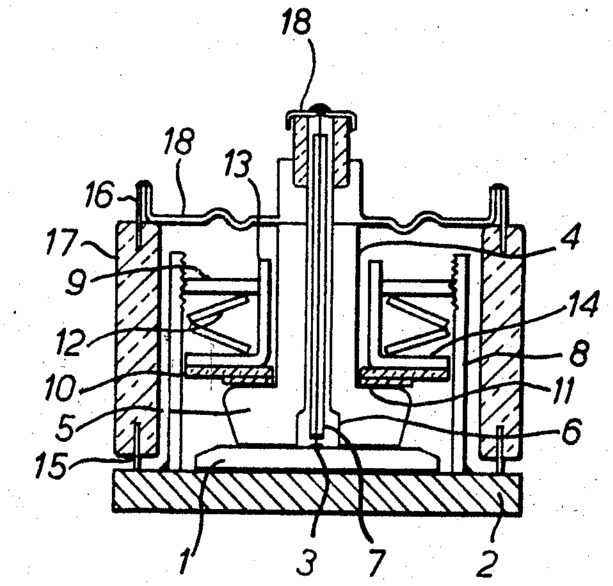
18
18
13
16
17
9
12
10
5
15
4
14
8
11
6
1
3
7
2

3,461,358

ENCAPSULATED DIODE WITH SPRING PRESSED CONTACTS AND REDUCED IONIZATION STRESSES

Colin Bright Lewis, Nettleham, Lincoln, England, assignor to Associated Electrical Industries Limited, London, England, a British company Filed May 19, 1967, Ser. No. 639,823
Claims priority, application Great Britain, June 20, 1966, 27,484/66
Int. Cl. H01l 1/02, 1/14
U.S. Cl. 317—234 8 Claims

ABSTRACT OF THE DISCLOSURE

In a semi-conductor rectifier in which a semi-conductor element is held by pressure producing means between and in contact with two conductive members, with the pressure producing means surrounding part of one of the conductive members, an equipotential surface is provided between the pressure producing means and said part of the member to reduce ionisation stresses and possible insulation failure in the rectifier.

BACKGROUND OF THE INVENTION

This invention relates to semi-conductor rectifiers in which a semi-conductor junction element is held by pressure producing means between two conductive members.

DESCRIPTION OF THE PRIOR ART

Semi-conductor rectifiers are known in which a semi-conductor junction element having surface electrodes on opposite faces thereof is held between two conductive members by spring means. It is also known for one of the conductive members to be in the form of a rigid plate constituting part of the housing of the rectifier and for the other member to be an elongate terminal which is surrounded by the spring means. The spring means are connected electrically to the rigid plate and so when the rectifier is in use the spring means and the elongate terminal are at different potentials. The electrical stress between the elongate terminal and the spring means, particularly at any sharp edges thereon may be sufficient to set up ionisation in the rectifier.

When ionisation occurs in the rectifier it may lead to failure of the device due to insulation failure at a lower working voltage than would cause breakdown of the semi-conductor element.

It is an object of the present invention to reduce the chances of ionisation occurring in a semi-conductor rectifier by providing an equipotential surface which screens the pressure producing means from the conductive member nearest thereto.

SUMMARY OF THE INVENTION

According to the present invention, in a semi-conductor rectifier a wafer of semi-conductor material having at least one junction therein between regions of the wafer of opposite conductivity type and a pair of electrodes one on each of the opposite faces of the wafer is held by pressure producing means between two conductive members one of which includes a cylindrical shank surrounded by said pressure producing means with said electrodes in electrical contact with respective members and wherein a conductive cylindrical sleeve disposed between the shank and the pressure producing means is spaced from the shank and connected electrically to the other conductive member.

The conductive cylindrical sleeve provides an equipotential surface around the shank of the conductive member and in this way the pressure producing means is shielded from the shank of the conductive terminal thereby reducing the possibility of local high voltage stress being set up between any conductive part of the pressure producing means and the shank when the rectifier is in use.

In one embodiment of the invention the conductive member which includes the shank is urged by pressure producing means in the form of conductive springs towards the other conductive member which is constituted by the base of a housing enclosing said wafer and spring means. It is convenient for the cylindrical shank of the conductive member to be terminated at one end by a generally cylindrical body coaxial with and of greater diameter than said shank and for said spring means to indirectly engage the end face of the body from which the shank projects. The spring means only engage the body indirectly because it is necessary to include at least some electrically insulating material between the body and the spring means.

In order that the invention may be more readily understood it will now be described, by way of example, with reference to the accompanying drawing which is a sectional side elevation of a thyristor in accordance with one embodiment of the invention.

A semi-conductor PNPN wafer 1 having a pair of parallel opposite faces is mounted with one face in contact with a conductive member, conveniently a copper plate 2, which forms the base of the housing of the thyristor. The face of the wafer which is in contact with the member has an electrode over substantially all of its surface and an annular electrode which serves as the emitter electrode is provided on the opposite face of the wafer. The annular electrode surrounds a further electrode 3 which serves as a trigger electrode. A conductive terminal member comprises a shank 4 with an enlarged generally cylindrical head portion 5 terminating one end of the shank. A central bore 6 extending axially of the shank and the head and the annular outer end face of the head is in contact with the annular emitter electrode on the wafer. A conductor 7 extends in insulated relation along the bore 6 in the conductive terminal and makes contact with the further electrode 3.

A metal tube 8 is secured at one end to the plate 2 and surrounds the wafer and the conductive terminal member 4, 5. The tube is internally threaded at its upper end and a locking ring 9 has a threaded outer periphery which engages with the threaded part of the tube 8 so that the ring can move axially of the tube. An annular insulating disc 10 of electrically insulating material rests on the upper surface of a steel load spreading washer 11 which in turn is supported on the enlarged head portion of the conductive terminal and pressure producing means in the form of a stack of bowed metal washers 12 known as Belleville washers, located within the tube 8 between the locking ring and the annular disc 10. A conductive cylindrical sleeve 13 having an outwardly extending flange 14 at one end is arranged coaxially around and spaced from the shank of the conductive terminal with the flange 14 located between the stack of Belleville washers and the insulating disc 10. The flange 14 and the washer 11 serve to spread and equalise the pressure exerted by the Belleville washers around the upper surface of the enlarged head portion of the conductive terminal member and the pressure applied to the conductive terminal member can be varied by means of the metal locking ring 9.

An annular metal sleeve 15 is secured to the plate 2 and surrounds the lower end of the steel tube 8. The sleeve is connected to a further annular metal sleeve 16 through an insulating ring 17. The thyristor housing is hermetically sealed by a metal cover member 18 which is argon arc welded, soldered or brazed around its periphery to the annular sleeve 16. A thickened central part of the cover member is connected electrically to the upper end of the shank of the conductive terminal member and serves as the emitter terminal and the trigger terminal 18 is supported on and insulated from the central thickened portion of the cover member.

To give further protection against electrical breakdown, after assembly but before sealing of the thyristor housing, the housing may be filled with a suitable insulating sealing material, for example, silicone rubber. The housing is filled with this material under vacuum to prevent pockets of air from being trapped in the housing since pockets of air would nullify the advantage gained by filling the housing with a sealing material having a higher breakdown strength than air.

To further reduce the possibility of high local electrical fields being set up, at least the peripheral edge of the end face of the cylindrical body from which the shank projects is rounded off as shown in the drawing.

When it is not necessary for the rectifier to be controlled, the semi-conductor wafer is simpler in that only one P–N junction between regions of opposite conductivity type is required and consequently a trigger electrode is not provided on the wafer.

Should the pressure producing means be of non-conductive material such as rubber, it is likely that a metal ring similar to the ring 9 would be employed to load the material and the conductive cylindrical sleeve serves to shield the metal ring from the shank.

I claim:

1. A semi-conductor rectifier comprising
- a wafer of semi-conductor material having at least one junction therein between regions of the wafer of opposite conductivity type and a pair of electrodes one on each of the opposite faces of the wafer,
- a first conductive member,
- a second conductive member which includes a cylindrical shank,
- pressure producing means surrounding said shank and holding said wafer between said conductive members with said electrodes in electrical contact with respective members, and
- a conductive cylindrical sleeve connected electrically to said first conductive member and disposed between said shank and said pressure producing means and spaced from said shank.

2. A semi-conductor rectifier as claimed in claim 1, in which said first conductive member comprises the base of a housing enclosing said wafer and said pressure producing means.

3. A semi-conductor rectifier as claimed in claim 1, in which said second conductive member comprises said cylindrical shank and a generally cylindrical body of greater diameter than said shank with said shank arranged coaxial with and projecting from an end face of the body.

4. A semi-conductor rectifier as claimed in claim 3, in which said conductive cylindrical sleeve has an outwardly extending flange at one end and said flange is disposed between said end face of the body and said pressure producing means with electrical insulation between said end face and said flange.

5. A semi-conductor rectifier as claimed in claim 1, in which said pressure producing means comprises a compressed stack of resilient metal washers.

6. A semi-conductor rectifier comprising
- a housing including a metal base which base serves as a first conductive member,
- a metal tube secured to and projecting from said base,

- a wafer of semi-conductor material having at least one junction therein between regions of the wafer of opposite conductivity type and a pair of electrodes one on each of the opposite faces of the wafer, a second conductive member comprising a cylindrical shank and a generally cylindrical body of greater diameter than said shank with said shank arranged coaxial with the body and projecting from one end face thereof,
- spring means surrounding said shank and acting between said tube and said end face of the body to hold said wafer in the tube with one electrode in contact with said metal base and the other in contact with said cylindrical body, and
- a conductive cylindrical sleeve connected electrically to said base and disposed in said tube between said shank and said spring means and spaced from said shank.

7. A semi-conductor rectifier as claimed in claim 6, in which said spring means comprises a stack of bowed resilient metal washers located in said tube and compressed by a metal locking ring engaging with said tube.

8. A thyristor comprising
- an hermetically sealed housing including a metal base, which base serves as a first conductive member, a metal tube secured to and projecting from said base,
- a wafer of semi-conductor material having a PNPN structure, an annular electrode on one of the opposite faces of the wafer, a gate electrode within said annular electrode and an electrode on the other face of the wafer,
- a second conductive member comprising a cylindrical shank and a generally cylindrical body of greater diameter than said shank with said shank arranged coaxial with the body and projecting from one end face thereof, and with said shank and said body defining an axial bore such that said other end face is of annular form,
- a stack of bowed resilient metal washers surrounding said shank and acting between said end face of the body and said tube to hold said wafer in the tube with said annular electrode in contact with said annular end face of said cylindrical body and the electrode on said other face of the wafer in contact with said metal base,
- an electrical connection extending in insulating relation along said axial bore to said gate electrode, an annular insulating washer between said washers and said cylindrical body, and
- a conductive cylindrical sleeve having an outwardly extending flange at one end with said flange disposed between said stack of metal washers and said insulating washer and said sleeve disposed in said tube between said shank and said stack of washers and spaced from said shank.

References Cited

UNITED STATES PATENTS

| | | | |
|---|---|---|---|
| 3,221,219 | 11/1965 | Emeis et al. | 317—234 |
| 3,252,060 | 5/1966 | Marino et al. | 317—234 |
| 3,296,506 | 1/1967 | Steinmetz et al. | 317—234 |

JAMES D. KALLAM, Primary Examiner

U.S. Cl. X.R.

29—588